(12) United States Patent
Phillips

(10) Patent No.: US 6,524,694 B1
(45) Date of Patent: Feb. 25, 2003

(54) COMPOSITIONS FOR IMPARTING A TRANSLUCENT OPTICAL EFFECT TO TRANSPARENT THERMOPLASTIC POLYMERS

(75) Inventor: Tracy L. Phillips, Lawrenceville, GA (US)

(73) Assignee: PolyOne Corporation, Avon Lake, OH (US)

( * ) Notice: Subject to any disclaimer, the term of this patent is extended or adjusted under 35 U.S.C. 154(b) by 0 days.

(21) Appl. No.: 09/480,955

(22) Filed: Jan. 11, 2000

Related U.S. Application Data

(63) Continuation-in-part of application No. 08/876,003, filed on Jun. 13, 1997, now abandoned.

(51) Int. Cl.$^7$ .................................................. B32B 5/02
(52) U.S. Cl. ........................................ 428/323; 524/404
(58) Field of Search ................................. 428/323, 332, 428/324, 325, 328, 330, 331, 329; 264/211; 524/239, 261, 275, 277, 313, 318, 404, 413, 423, 424, 425, 430, 447, 449, 451, 493; 362/812

(56) References Cited

U.S. PATENT DOCUMENTS

| | | | |
|---|---|---|---|
| 4,010,289 A | 3/1977 | Kobayashi et al. | 427/520 |
| 4,164,298 A | 8/1979 | Nishikawa et al. | 215/47 |
| 4,179,488 A | 12/1979 | Nishikawa et al. | 264/521 |
| 4,320,207 A * | 3/1982 | Watanabe et al. | 521/54 |
| 4,377,616 A | 3/1983 | Ashcraft et al. | 429/213 |
| 4,423,164 A * | 12/1983 | Bar | 47/17 |
| 4,481,163 A | 11/1984 | Ota et al. | 264/513 |
| 4,483,759 A | 11/1984 | Szycher et al. | 522/20 |
| 4,496,620 A | 1/1985 | Park et al. | 428/323 |
| 4,615,941 A | 10/1986 | Lu | 428/327 |
| 4,615,942 A | 10/1986 | Lu | 428/327 |
| 4,788,232 A * | 11/1988 | Needham | 523/351 |
| 4,877,679 A | 10/1989 | Leatherman et al. | 442/58 |
| 4,906,676 A | 3/1990 | Ida | 523/212 |
| 5,231,127 A | 7/1993 | Kroenke et al. | 524/403 |
| 5,234,648 A | 8/1993 | Van Es et al. | 264/171 |
| 5,258,215 A | 11/1993 | Van Es et al. | 428/64 |
| 5,318,127 A | 6/1994 | Nissel | 428/35.7 |
| 5,318,811 A | 6/1994 | Nissel | 428/35.7 |
| 5,436,043 A | 7/1995 | Hatano et al. | 428/35.7 |
| 5,534,582 A * | 7/1996 | Krause et al. | 524/441 |
| 5,744,534 A | 4/1998 | Ishiharada et al. | 524/442 |
| 5,804,020 A | 9/1998 | Akao et al. | 156/251 |
| 5,843,417 A * | 12/1998 | Hanna et al. | 424/401 |
| 5,907,006 A | 5/1999 | Rennie et al. | 524/223 |

FOREIGN PATENT DOCUMENTS

| | | |
|---|---|---|
| DE | 4326521 | 2/1994 |
| EP | 0101667 | 2/1984 |
| GB | 1595426 | 8/1991 |
| JP | 5039400 | 2/1993 |
| JP | 9071685 | 3/1997 |
| WO | WO95/12489 * | 5/1995 |

OTHER PUBLICATIONS

Encyclopedia of Polymer Science and Engineering, vol. 1: Additives, pp. 472–475, Aug. 1985.*
Encyclopedia of Polymer Science and Engineering, vol. 14: Release Agents, pp. 411–420, Oct. 1989.*
Encyclopedia of Polymer Science and Engineering, vol. 10: Pelletizing, pp. 802–810, Mar. 1988.*
Sukano Products Datasheet for Sukano G ma S 145 matting agent for PET/PETG, Chemiehandel SE, AG, Schindellegi, Switzerland, 1995.

* cited by examiner

*Primary Examiner*—Paul Thibodeau
*Assistant Examiner*—Ramsey Zacharia
(74) *Attorney, Agent, or Firm*—Jones, Day, Reavis & Pogue

(57) ABSTRACT

The invention provides compositions and methods for imparting a translucent optical effect to transparent thermoplastic polymers. The compositions comprise the thermoplastic polymer and 0.01 to 15 parts per hundred by weight (preferably 0.1 to 6, more preferably 0.2 to 5 parts by weight, even more preferably 0.5 to 2 parts by weight, and most preferably 0.5 to 1.5 parts by weight) of at least one particulate, light diffusing material in the form of powders, fibers, whiskers, platelets, flakes, aggregates, agglomerates, and mixtures of these, comprising a average maximum particle size of from about 0.1 microns to about 200 microns (preferably from about 1 to about 100 microns). A first embodiment of the invention comprises a one step method for imparting the translucent optical effect. A second embodiment comprises a two step method, including the use of a concentrate composition. The translucent optical effects are obtainable in a continuum of very smooth to very grainy, depending on the type and concentration of the particles employed.

12 Claims, No Drawings

COMPOSITIONS FOR IMPARTING A TRANSLUCENT OPTICAL EFFECT TO TRANSPARENT THERMOPLASTIC POLYMERS

This application is a continuation-in-part (CIP) of U.S. patent application, Ser. No. 08/876,003, now abandoned filed Jun. 13, 1997.

BACKGROUND OF THE INVENTION

Transparent thermoplastic polymers are widely used in place of glass in the manufacture of a variety of products because of their light weight, their resemblance to glass, their economical use, and their excellent impact resistance and other physical properties. For example, transparent blow-molded containers, such as vials, cosmetic bottles, liquid flavoring containers and beverage bottles made of polyethylene terephthalate (PET), are increasingly in demand because they are easily molded and relatively inexpensive. Transparent thermoplastic polymers are used for a variety of other molded, extruded or formed products, such as drinking cups, cooking and eating utensils, food containers, refrigerator storage containers, medical and pharmaceutical tubing and extruded parts, packaging films, extruded sheets and toys. In addition to PET, the transparent polymers commonly used in the manufacture of these products include, for example, styrene acrylonitrile copolymers (SAN), polycarbonates, acrylics, ionomers, polystyrenes, and the like.

Although most transparent plastics have excellent clarity and resemblance to glass, it is desirable in many cases to improve the aesthetic appearance of transparent plastic products by making them translucent, i.e. "frosted". In the context of the invention, the terms "translucent" and "frosted" are intended to encompass all gradations of translucency, from almost transparent to almost opaque. Such treatment is intended to impart a softer, more elegant and high grade visual textured appearance to the plastic. Containers and other products having a frosted glass appearance are in demand particularly in the packaging of cosmetics, health, beauty and personal hygiene goods, foods and beverages, as well as for household products, such as frozen food trays, tableware (dishes, cups, plates) and other decorative and utilitarian housewares, and other products, such as cigarette lighters. The frosted glass appearance can be visual only (a smooth surface) or can be both visual and tactile (a rough surface).

Conventional methods for making transparent plastic products translucent include spraying the smooth outer surface of the plastic product with a coating to form a matte surface layer. The plastic article appears frosted because the rough surface diffusely reflects light. Such matte coatings, however, tend to be easily separated from or scratched off the smooth polymer surface due to friction with other articles, and they require an extra production step which adds to production costs. Another method employs a mold with an inner surface that has been roughened to impart a rough or textured matte finish to the molded product. However, the roughened mold may be more expensive to manufacture than a standard mold and, because it is permanent, the mold is limited to producing finished products having a matte surface. Moreover, rough matte surfaces that are designed to resemble ground or frosted glass have tiny projections and recesses that reflect light but may be unpleasant to the touch and easily soiled due to dust and oils transferred from the hands. Oils, in particular, fill recesses and add shine to these rough surfaces. Thus, the amount of diffused light is decreased and any original lustrous appearance may be readily lost.

Other reported methods for achieving a frosted effect in blow-molded bottles and other containers include injection molding of a preformed piece, followed by sandblasting and then heat-crystallizing of the outer surface to roughen and opacify the surface layer prior to the blow molding step. A ground glass effect has been produced in plastic containers by using a blend of olefin resins in which one resin comprises a continuous phase in which another resin is dispersed. Frosted surfaces on bottles have been achieved by heat-crystallizing the outer surface while leaving the inner surface transparent, to form a milky white or translucent effect. Chemical flatting agents have also been employed to opacify acrylic.

Although the above methods produce various types of frosted glass effects, there is still a need for simple and inexpensive methods and compositions for imparting a translucent frosted glass effect to transparent thermoplastic polymers.

SUMMARY OF THE INVENTION

The invention provides inexpensive compositions and one-step and two-step methods for imparting a variety of individual translucent optical effects to transparent thermoplastic polymers. The methods and compositions of the invention are particularly useful for imparting a lustrous and rich translucent optical effect to packaging products, such as blow-molded and injection molded products manufactured from polyethylene terephthalate (PET) and styrene acrylonitrile copolymer (SAN), which have traditionally been left transparent because of their excellent clarity and resemblance to glass. Although the invention is herein described with respect to transparent polymers, a translucent effect may also be obtained by the compositions and methods of the invention in polymers that are "near transparent", such as high density polyethylene and polypropylene. The term "transparent", as used herein below, is intended to encompass all grades of thermoplastic polymers that are "near transparent" as well as transparent.

The desired translucent optical effect is selectable from a continuum of visual effects from very smooth to very grainy, and is accomplished by selecting an appropriate invention composition and method. Transparent or semitransparent color compounds, pigments and dyes may also be added to the invention compositions to produce colored translucent products.

The invention employs conventional molding, extruding and forming techniques with existing tooling. Thus, the methods do not require expensive extra production steps; nor do they require specialized tools. By the method, a translucent visual frosted glass effect can be imparted to virtually any transparent or near transparent thermoplastic polymer used in the production of molded, extruded or formed products, including films.

In one embodiment of the invention, a one-step method comprises forming a composition comprising (i) 0.01 to 15 parts by weight of at least one particulate, light-diffusing material having an average maximum particle size of about 0.1 micron to about 200 microns, preferably about 1 micron to about 100 microns, and (ii) 85 to 99.99 parts by weight of at least one transparent thermoplastic polymer. The mixture may be molded, extruded or formed by conventional means to form a translucent polymer product.

The particulate material may be in the form of, for example, powders, flakes, platelets, fibers, whiskers, aggregates, agglomerates and mixtures of these. Preferably, the particulate material is selected from the group consisting essentially of calcium sulfates, talc, silicates, kaolin, silicas, mica flakes, mica platelets, mica pearls, titanates, metal sulfates, metal carbonates, sulfides, metal oxides, borides, wollastonite, basalt, boron, boron nitrides, ceramics, naturally occurring calcium carbonates, and mixtures of the foregoing. If the particulate material is boron nitride, it is preferably in the form of for example, powders, aggregates, agglomerates, and the like, or mixtures of these.

In another embodiment of the invention, a two-step method is employed that comprises the steps of forming a concentrate composition which comprises a mixture of (i) 40 to 90 parts by weight of a carrier agent selected from the group consisting of a first transparent thermoplastic polymer, a dispersing agent, and mixtures of these, and (ii) 10 to 60 parts by weight of at least one particulate, light-diffusing material having an average maximum particle size of about 0.1 to 200 microns, preferably about 1 to about 100 microns, as described above. If a mixture of the first polymer and the dispersing agent is employed, the mixture preferably comprises 80 to 98 parts by weight of the first polymer and 2 to 20 parts by weight of the dispersing agent. The carrier agent is preferably finely ground, finely flaked, finely pelletized or a mixture of these, and, more preferably is finely ground. For purposes of this invention, finely ground means a size of about 10 mesh or finer, preferably about 20 mesh; finely flaked means a maximum dimension of about ½ inch or less, preferably a maximum dimension of about ¼ inch or less; and finely pelletized means a maximum diameter of about ⅛ inch or less, preferably a maximum diameter of about 1/16 inch or less. The concentrate, in an amount of 0.1 to 15 parts by weight, is then mixed with 85 to 99.9 parts by weight of a second transparent thermoplastic polymer that is chemically compatible with the carrier agent, to form a second mixture which is then molded, extruded or formed by conventional means to form the translucent polymer product. The first and second transparent thermoplastic polymers may be the same or different and are selected from the group described above. The method may optionally include a further step in which the concentrate is extruded and pelletized before adding it to the second polymer.

By either the one-step method or the two-step method, the resulting translucent polymer product comprises 0.01 to 15 parts by weight of the total particulate material and exhibits an average translucency having a measured transmittance that is about 2% to about 65% lower than the transmittance of a polymer part comprising the polymer alone; a haze that is about 900% to about 11,400% higher than the haze of a polymer part comprising the polymer alone; and a clarity that is about 7% to about 95% lower than the clarity of a polymer part comprising the polymer alone, all at a molded part thickness of 30 mils.

DETAILED DESCRIPTION OF THE INVENTION

A translucent frosted glass effect in transparent thermoplastic molded, extruded or formed polymer products is obtained by the methods and compositions of the invention. The compositions and methods may be employed to impart a translucent optical effect to virtually any transparent or near transparent grade of thermoplastic polymer including, but not limited to, polyolefins (including, but not limited to polypropylene, polyethylene and clarified grades thereof), polyethylene terephthalate, glycol-modified polyethylene terephthalate, glycol-modified polycyclohexanemethanol terephthalate, acid-modified polycyclohexanemethanol terephthalate, polystyrene, styrene acrylonitrile copolymers, polystyrenebutadiene, polystyreneacrylic ester, acrylonitrile-butadiene-styrene, acrylonitrile-styrene-acrylic ester, acrylics, polymethacrylonitrile, polyethylenemethylacrylate, polymethylmethacrylate, polyethylene-ethylacrylate, polyethylenebutylacrylate, polyethyleneacrylic ester, cellulose butyrate, polymethylpentene, polyisobutene, polybutene, polyamides, polycarbonate, ionomers, polyurethane, liquid crystal polymers, cellulose propionate, polyvinyl alcohol, polyethylenevinylalcohol, polyethylenevinylacetate, polyvinyl chloride, high density polyethylene, polypropylene, polyacetal, and copolymers, grafts and blends of the foregoing.

The frosted glass effect may be a visual effect only, such as that obtained when a composition of the invention is extruded, formed, or produced in a mold having a smooth surface, to produce a smooth-surfaced translucent product. Alternatively, the effect may be both visual and tactile, such as that obtained by molding the composition of the invention in a mold having a textured surface to impart a matte finish to the translucent product. As described further below, transparent or semitransparent color concentrates, pigments or dyes may also be blended with the invention compositions to produce colored translucent products, such as a "pink frost", a "green frost", a "lavender frost" etc., in addition to a "clear" or "natural" frosted product. Suitable organic pigments, inorganic pigments and polymer-compatible dyes are known to those skilled in the art of making colored polymers.

The translucent optical effects imparted by the compositions and methods of the invention are achieved by mixing very small quantities of light-diffusing particles, having an average maximum particle size of about 0.1 to about 200 microns, preferably about 1 to about 100 microns, with a transparent thermoplastic polymer prior to molding or extruding the mixture. Preferably, the particles are selected on the basis of their ability to reflect and transmit light diffusely, rather than rectilinearly or specularly, and the translucent visual effect more closely resembles a matte finished molded or spray-coated product. Thus, for example, light-diffusing materials, such as non-shiny mica particles used for laser marking, are preferred over light reflecting (specular) materials, such as mica pearls. However, mica pearls may also be employed to achieve a frosted effect with a more "satin" appearance.

To achieve the desired frosted effect, the light-diffusing particles may be in any form, such as powders, fibers, whiskers, platelets, flakes, aggregates, agglomerates or mixtures of these. Suitable particles include, but are not limited to, naturally occurring calcium carbonates, including reagent-grade calcium carbonate, ground chalk, ground limestone, ground marble and ground dolomite; ground or fiber calcium sulfates; silicates, such as glass fibers, glass flakes, solid and hollow glass spheres, aluminum silicate, synthetic calcium silicate and zirconium silicate; talc; kaolin; mica flakes, platelets and pearls; natural silicas, such as sand, quartz, quartzite, perlite, tripoli and diatomaceous earth; fumed silicas; titanates, such as barium titanate; sulfates, such as barium sulfate; sulfides, such as zinc sulfide and molybdenum sulfide; metallic oxides, such as aluminum oxide, zinc oxide, beryllium oxide, magnesium oxide, zirconium oxide, antimony oxide, titanium dioxide and aluminum hydroxide; aluminum diboride flakes; inorganic fibers, such as wollastonite, basalt, boron, boron nitrides and ceramic; single crystal fibers (i.e. whiskers), such as those of alumina trihydrate; short fibers, such as those of aluminum silicate with aluminum and magnesium oxides and calcium sulfate hemihydrate; organic flatting agents, such as wood flour and starch; and mixtures of any of the foregoing. If the particulate material is boron nitride, it is preferably in the form of, for example, powders, aggregates, agglomerates, and the like, or mixtures of these.

A desired translucent optical effect ranging in a continuum from very smooth visual textured effects to very grainy visual textured effects may be achieved, depending on the particulate material or mixture of particulate materials selected and the quantity of the particulate employed. For example, a smooth visual translucency is obtained by using white powder particulates, such as barium sulfate, zinc sulfide or ultrafine ground chalk. Slightly grainy visual translucency is obtained by using transparent particulates, such as solid glass microspheres having a particle diameter of about 2 to about 100 microns (preferably about 4 to about 44 microns) or hollow glass microspheres having a particle diameter of about 10 to 100 microns (preferably about 65 to about 75 microns); whereas a slightly more grainy visual translucency is obtained by using ceramic fibers having a diameter of about 2 to about 12 microns, and lengths of about 45 microns to about 1.5 millimeters (mm). Grainy translucent visual effects are also obtained with additives such as lamellar kaolin having an aspect ratio of 10:1 (length:diameter). To obtain very grainy visual translucent effects, wollastonite having aspect ratios ranging from about 5:1 to 15:1, are employed, with the highest aspect ratios giving the grainiest effects. Very grainy translucent visual effects are also achieved by using whiskers, such as such as those of alumina trihydrate, and metal flakes or platelets, such as those of mica.

Exemplary suitable particles for use in the invention are Sachtleben Blanc Fixe Micro® 2278N (milled barium sulfate, approximately 3 microns, available from Whittaker, Clark & Daniels, Inc., South Plainfield, N.J. (manufacturer Sachtleben, Germany); Omyacarb® 4 (calcium carbonate, 3.5 micron median, 15 micron max, Omya Inc.); Talc 399 (talc (magnesium silicate), available from Whittaker, Clark & Daniels, Inc., South Plainfield, N.J. (manufacturer Specialty Mineral); Zeeospheres® W-610 (ceramic microspheres, mixture of particle sizes of approximately 2 to 45 microns, Zeelan Industries, St. Paul, Minn.); Silcron® G602 (fine particle silica, average particle size approximately 2.7 microns, SCM Pigments, Baltimore, Md.); NYAD G® Wollastocoate (wollastonite, aspect ratio 15:1, 100–325 mesh), NYAD® 400 wollastonite (aspect ratio 5:1), 400 Wollastocoate (aspect ratio 5:1, 400 mesh) (NYCO Minerals, Inc., Willsboro, N.Y.); hollow glass microspheres (glass bubbles, 3M Corporation); Acematt® TS 100 (silica flatting agent, average particle size approximately 2 to 10 microns, Degussa Corp., Ridgefield Park, N.J.); Iriodin®/ Lazer Flair® LS 810 (mica-based additive, particle size approximately 2 to 28 microns, EM Industries, Hawthorne, N.Y.); Afflair® 110 Fine Satin (mica-based additive, E.M. Industries, Hawthorne, N.Y.); Polartherm® (PT110 (Advanced Ceramics Corporation, Cleveland, Ohio; boron nitride particulate material, exhibiting a particle size distribution as follows: 10% of particles 23.770 microns or smaller, 50% of particles 49.920 microns or smaller, and 90% of particles 73.710 microns or smaller); and Carborundum Carbotherm® AS0517 (Carborundum Corporation, Amherst, N.Y.; boron nitride particulate material, agglomerates: approximate particle size 30 microns).

Because the quantities of the particulates employed in the invention compositions and methods are extremely small, the particulates do not perform the traditional functions of fillers (e.g. reinforcers, extenders, opacifiers, plasticizers, etc.).

In one embodiment of the invention, a one-step method for imparting a translucent optical effect to a transparent thermoplastic polymer is employed, and comprises the steps of forming a substantially homogeneous composition comprising a mixture of (i) 0.01 to 15 parts by weight of at least one particulate, light-diffusing material having an average maximum particle size of from about 0.1 microns to about 200 microns, and (ii) 85 to 99.99 parts by weight of a transparent thermoplastic polymer; and molding, extruding or forming the homogeneous mixture to form a translucent molded, extruded or formed polymer product. Preferably the particles have an average maximum size of from about 1 to about 100 microns. Preferably, the mixture comprises 0.1 to 6 parts by weight of the particulate material, more preferably, 0.2 to 5 parts by weight, even more preferably, 0.5 to 2 parts by weight, and most preferably 0.5 to 1.5 parts by weight of the particulate material.

In this embodiment of the invention, to achieve a substantially homogeneous mixture of the particulates and the polymer for a homogeneous translucent optical effect, it is preferred that the polymer be finely ground 20-mesh powder. The pelletized polymer may be finely ground to a 20-mesh powder prior to mixing with the particulates or the polymer may be purchased as a finely ground powder, when available. As discussed further below, a dispersing agent and/or a flow enhancing (anti-bridging) agent may also be added to the particulate mixture to aid in achieving homogeneity. For practical purposes, when mixing large amounts of polymer with particulates, the polymer will not be preground in powder from but may be used in commercially available pellet form (average diameter $\frac{1}{16}$ inch to $\frac{1}{8}$ inch or greater). The achievable homogeneity of a pelleted polymer/ particulate mixture, however, depends upon such factors as the type of particulate employed, the pellet and particulate diameter or size, the mixing time, the natural segregation of the components during the time period before use, and the like, resulting in a product which may have a variable, rather than a homogeneous, overall translucent appearance. Thus, this embodiment of the composition and method is less preferred if a high degree of homogeneity of the optical effect is desired. Homogeneity of a pelleted polymer/ particulate mixture may be improved by separately metering the polymer pellets and the particulates (frosting agents, and/or dispersants and/or flow enhancers) through separate feed lines into the melting screw portion of any device used during the melt mixing phase of the extruding, molding or forming process.

In another embodiment of the invention, a two-step method is employed. By this method, a substantially homogeneous concentrate mixture comprising at least one particulate material in a carrier agent is prepared. A desired quantity of this concentrate is then blended with a chemically compatible polymer (let down resin) to form a second mixture, which is then molded, extruded or formed and cured, as described above, to form the translucent polymer product. The degree of translucency can be adjusted by increasing or decreasing the loading (i.e. the "let down ratio" of concentrate to let down resin) of the concentrate in the end product.

The two-step method comprises the steps of forming a concentrate composition comprising a mixture of (i) 40 to 90 parts by weight of a carrier agent that is finely ground, finely flaked, finely pelletized, or a mixture of these, selected from the group consisting essentially of a first transparent thermoplastic polymer, a dispersing agent, or mixtures of these, and (ii) 10 to 60 parts by weight of at least one particulate, light-diffusing material as described above, to form a second mixture that comprises 0.01 to 15 parts by weight of the composition and 85 to 99.99 parts by weight of a second transparent thermoplastic polymer that is chemically compatible with the carrier agent. The second and first transparent thermoplastic polymers may be the same or different and are selected from the group described above. For purposes of this invention, finely ground means a size of about 10 mesh or finer, preferably about 20 mesh; finely flaked means a maximum dimension of about ½ inch or less, preferably a maximum dimension of about ¼ inch or less; and finely pelletized means a maximum diameter of about 1/16 inch or less, preferably a maximum diameter of about ⅛ inch or less. The dispersing agent comprises a low molecular weight substantially transparent polymeric material, such as a silicone wax, a fatty acid, a metallic salt, an ionomer wax, an amide wax, a hydroxy stearate, an olefinic wax, or a mixture of any of the foregoing, and is preferably a bis-stearamide or a hydroxy stearate.

The concentrate and second polymer may be combined in a process during the melt mixing phase, such as by their separate metering into the melting screw portion of the device through separate feed lines. Alternatively, the concentrate and the second polymer may be mechanically combined prior to the introduction of the mixture into a molder or extruder. The mixture is then molded or extruded to form a translucent polymer product.

The carrier agent may comprise any agent that is capable of forming a substantially homogeneous dispersion therein of the particulate material. The carrier agent may comprise finely ground (e.g. 20 mesh) polymer pellets, a polymer that is commercially available finely ground, a combination of powdered and pelletized polymers, or a finely ground or finely flaked dispersing agent, such as a silicone wax, fatty acid, metallic salt, ionomer wax, amide wax, hydroxy stearate, olefinic wax, or a mixture of any of these. Exemplary dispersing agents comprise a bis-stearamide, such as ethylene-bis-stearamide, or a hydroxy stearate, such as Castorwax® (Caschem, Bayonne, N.J.). To prepare finely ground polymer pellets, commercially available polymer pellets are ground by conventional methods, such as in an ambient or cryogenic grinder, to about a 20-mesh powder. Some polymers are also commercially available finely ground. Fine flaking of the wax-base dispersing agent is achieved by known methods to form flakes that are typically irregular or uneven and preferably have a maximum dimension of ¼ inch.

Optionally, when the finely ground polymer is employed as the carrier agent, 0 to 20 parts per weight of a dispersing agent and/or 0.1 to 7 parts, preferably 1 to 2 parts, of a flow enhancing or anti-bridging agent, such as fumed or precipitated silica, may be added to the mixture. One to 2 parts by weight of a flow enhancing agent may also be added to the mixture when a dispersing agent is employed as the carrier agent. Other additives, known to those skilled in the art of polymer compounding, may include anti-oxidants, UV absorbers/light stabilizers, and the like, in quantities that do not contribute substantially to or interfere with the translucent optical effect. In addition, transparent or semi-transparent colorants, pigments and dyes may be added to the mixture to provide colored translucent products.

For purposes of this invention, a translucent optical effect is defined by measurements of the resulting polymer product (after hardening), of the transmittance, haze, and clarity. Translucence is defined as a transmittance that is about 2% to about 65% lower than the transmittance of a polymer part comprising the polymer alone; a haze that is about 900% to about 11,400% higher than the haze of a polymer part comprising the polymer alone; and a clarity that is about 7% to about 95% lower than the clarity of a polymer part comprising the polymer alone, all at a molded part thickness of 30 mils. Measurements were made according to the procedures described in the operating manual of a Haze-Gard® Plus hazemeter (Byk-Gardner), which made reference to ASTM D-1003 and D-1044. The transmittance is a measurement of the amount of light transmitted through a sample, compared to the amount of light incident upon the sample (in a perpendicular beam). Haze is a measurement of the transmitted light scattered more than 2.5° from the axis of the incident light. Clarity is a measurement of the amount of the transmitted light scattered less than 2.5° from the axis of the incident light.

A translucent effect for purposes of this invention may also be defined by a measurement of the translucency of the polymer product, after hardening, by its contrast ratio. The contrast ratio is the ratio of the percent reflectance of a sample over a white background and the percent reflectance of the sample over a black background. Contrast ratios from 0 to 100 are obtainable, with samples having ratios of greater than 97 being considered opaque. When different samples are measured over the same white and black backgrounds, contrast ratios may be used for comparison of the relative degrees of opacity between samples. The polymer product formed by either the one-step method or the two-step method described above comprises 0.01 to 15 parts by weight of the particulate material and exhibits, after hardening, an average translucency having a contrast ratio that is about 2% to about 60% higher than the contrast ratio of a polymer part comprising the polymer alone, at a molded part thickness of 0.030 inches (30 mils).

The following examples are illustrative of the methods and compositions of the invention for imparting translucent effects to transparent thermoplastic polymers. The examples are not intended to be limiting, as other polymers, carrier agents, dispersing agents, flow enhancing agents, particulate materials, colorants, and other additives may be used in other quantities and combinations, without departing from the scope of the invention.

EXAMPLES 1–8

The formulations of each of nine concentrate compositions are listed in Table 1. Ground PET (20 mesh) is prepared by grinding commercially available PET pellets at ambient temperature. For each of the formulations, the ingredients are mixed in a Henschel mixer to obtain a uniform blend (about one to two minutes). The blend is then fed into an extruder and strand pelletized to form concentrate pellets, preferably miniature concentrate pellets having a diameter of 1/16 inch or less. The concentrate pellets are then ready for use in any injection molding, blow molding, extruding or forming process and are added to a compatible let down resin in the let down ratios (resin to concentrate) described in the Table.

EXAMPLES 9–19

Measurements are made of the translucency of blow-molded PET bottles having the formulations illustrated in Table 2 and manufactured from "natural frost" PET concentrates with let down ratios of 25:1. Test sample 12 comprises PET only, without particulate additives to obtain translucency. Samples 13–19 comprise PET and particulate additives, as shown. The "gloss" at 60° of samples 13–19 is significantly reduced when compared to sample 12 containing no particulate additives.

Contact clarity is a visual rating of clarity when looking through a sample at a black line on a piece of paper that is in contact with the back of the sample. Samples 13–15 and 19, comprising a combination of wollastonite and/or Zeeosphere® particulates, have less contact clarity than samples 16–18 comprising a single particulate additive.

Although the samples are a "natural" frost, they demonstrate a bluish or yellowish under tone or top tone, depending on the type of particulate additive employed, due to a degree of color tone imparted to the polymer by the additive.

Each of the samples 13–19 are translucent, and therefore slightly more opaque than sample 12 comprising PET alone. Contrast ratios of samples 13–19 are between 9% and 45% higher than that of sample 12 comprising PET alone, with the samples containing individual additives having the lowest contrast ratios, and thus the lowest opacities.

EXAMPLES 20–23

The formulations of three concentrate compositions, and one frost compound are listed in Table 3. Ground PET (20 mesh) is prepared by grinding commercially available PET pellets at ambient temperature. For each of the formulations, the ingredients are mixed in a Henschel mixer to obtain a uniform blend (about one to two minutes). The blend is then fed into an extruder and strand pelletized to form concentrate pellets, preferably miniature concentrate pellets having a diameter of $\frac{1}{16}$ inch or less. The concentrate pellets are then ready for use in any injection molding, blow molding, extruding or forming process and are added to a compatible let down resin in the let down ratios described above.

EXAMPLES 24–32

Measurements are made of the translucency of a molded plaque having the thickness and formulations illustrated in Table 4 and manufactured using boron nitride (Polartherm® 110) as a particulate, light diffusing material, and ethylene-bis-stearamide as a dispersing agent. Measurements were made according to the procedures described in the operating manual of a HazeGard® Plus hazemeter (Byk-Gardner), which made reference to ASTM D-1003 and D-1044. Loading percentage of boron nitride additive ranged from 0.1 to 50% by weight of final polymer product. Test sample 23 comprises general purpose polystyrene (GPPS) only, without particulate additives to obtain translucency. Samples 24–32 comprise GPPS, boron nitride (Polartherm® 110) as a particulate, light diffusing material, and ethylene-bis-stearamide as a dispersing agent. A 0.25 inch square of frosted glass (window pane grade glass, sand-blast textured on one side) was used as a benchmark.

EXAMPLES 33–44

Measurements are made of the translucency of a molded plaque having the thickness and formulations illustrated in Table 5, and manufactured using boron nitride (Polartherm® 110) as a particulate, light diffusing material, and Castorwax® (The Baker Castor Oil Company (Jersey City, N.J.)) as a dispersing agent. Measurements were made according to the procedures described in the operating manual of a HazeGard® Plus hazemeter (Byk-Gardner), which made reference to ASTM D-1003 and D-1044. Loading percentage of boron nitride additive ranged from 0.1 to 50% by weight of final sample. Test sample 33 comprises PET only, without particulate additives to obtain translucency. Samples 34–44 comprise PET, boron nitride (Polartherm® 110) as a particulate, light diffusing material, and Castorwax® as a dispersing agent. A 0.25 inch square of frosted glass (window pane grade glass, sand-blast textured on one side) was used as a benchmark.

EXAMPLES 45–51

Measurements are made of the translucency of a molded plaque having the thickness and formulations illustrated in Table 6, and manufactured using boron nitride (Carborundum Carbotherm® AS0517) as a particulate, light diffusing material, and Castorwax® as a dispersing agent. Measurements were made according to the procedures described in the operating manual of a HazeGard® Plus hazemeter (Byk-Gardner), which made reference to ASTM D-1003 and D-1044. Loading percentage of boron nitride additive ranged from 0.2 to 50% by weight of final sample. Test sample 35 comprises PET only, without particulate additives to obtain translucency. Samples 36–51 comprise PET, boron nitride (Carborundum Carbotherm® AS0517) as a particulate, light diffusing material, and Castorwax® as a dispersing agent. A 0.25 inch square of frosted glass (window pane grade glass, sand-blast textured on one side) was used as a benchmark.

EXAMPLES 52–65

Measurements are made of the translucency of a molded plaque having the thickness and formulations illustrated in Table 7. Measurements were made according to the procedures described in the operating manual of a HazeGard® Plus hazemeter (Byk-Gardner), which made reference to ASTM D-1003 and D-1044. Test sample 52 comprises GPPS only, without particulate additives to obtain translucency. Samples 53–65 comprise GPPS, various particulate, light diffusing materials, as indicated, and ethylene-bis-stearamide as a dispersing agent. A 0.25 inch square of frosted glass (window pane grade glass, sand-blast textured on one side) was used as a benchmark.

While the invention has been described herein with reference to particular embodiments, it is to be understood that it is not intended to limit the invention to the specific forms disclosed. On the contrary, it is intended to cover all modifications and alternative forms falling within the spirit and scope of the invention.

TABLE 1

(Examples 1–8)

| | |
|---|---|
| 1. Natural Frost Concentrate for PET | |
| Ground PET (.75 IV)[1] | 50% |
| Barium Sulfate | 50% |
| Let Down Ratio[2] | 66.7:1 |
| 2. Black Frost Concentrate for PET | |
| Ground PET (.8 IV) | 66.86% |
| Barium Sulfate | 31.78% |
| Channel Carbon Black[3] | 0.34% |
| Phthalocyanin Blue[4] | 0.02% |
| Castorwax ® | 1.00% |
| Let Down Ratio | 25:1 |
| 3. Natural Frost Concentrate for PET | |
| Ground PET | 50% |
| Wollastonite[5] | 50% |
| Let Down Ratio | 25:1 |
| 4. Natural Frost Concentrate for PET | |
| Ground PET | 50% |
| Hollow Glass Bubbles | 50% |
| Let Down Ratio | 25:1 |
| 5. Natural Frost Concentrate for PET | |
| Ground PET | 75% |
| Silcron ® G602 | 25% |
| Let Down Ratio | 25:1 |
| 6. Natural Frost Concentrate for PET | |

TABLE 1-continued (Examples 1–8)

|  |  |
|---|---|
| Castorwax ® | 30% |
| Zeeospheres ® W610 | 10% |
| NYAD G ® Wollastonite | 30% |
| NYAD ® 400 Wollastonite | 30% |
| Let Down Ratio | 20:1 |
| 7. Natural Frost Concentrate for PET | |
| Ground PET | 49.6% |
| Castorwax ® | 3.0% |
| Zeeospheres ® W610 | 6.8% |
| NYAD G ® Wollastonite | 20.3% |
| NYAD ® 400 Wollastonite | 20.3% |
| Let Down Ratio | 12.5:1 |
| 8. Natural Frost Concentrate for PET | |
| Ground PET | 75% |
| Zeeospheres ® W610 | 25% |
| Let Down Ratio | 20:1 |

[1]"IV" is the intrinsic viscosity of the grade of the polyethylene terephthalate (PET) employed.
[2]The ratio of the let down resin to the concentrate in the final composition suitable for molding, extruding or forming the final polymer product.
[3]Carbon black.
[4]An organic pigment. Pfister Chemical Inc., Ridgefield, NJ.
[5]Any of NYAD ® 400 (aspect ratio 5:1), NYAD G ® (aspect ratio 15:1), or 400 Wollastocoate (aspect ratio 5:1), or mixtures of these, may be used.
[6]Rohn & Haas Company, Philadelphia, PA.

TABLE 2

| Sample Number | Formula[1] G | 400 | W610 | PET | Gloss[2] 60° | 20° | 85° | Contact[3] Clarity | Under[4] Tone | Top[5] Tone | Contrast[6] Ratio |
|---|---|---|---|---|---|---|---|---|---|---|---|
| Baseline[7] | | | | | | | | | | | |
| 9 | 1.5 | 1.5 | 0.5 | 96.5 | 97.6 | 87.5 | 97.1 | 3 | N | | 20.27 |
| 10 | 1.5 | 1.5 | 0.5 | 96.5 | 97.0 | 87.2 | 97.7 | 3 | N | | 20.35 |
| 11 | 1.5 | 1.5 | 0.5 | 96.5 | 99.1 | 89.7 | 99.1 | 4 | N | | 20.99 |
| Test | | | | | | | | | | | |
| 12 | 0 | 0 | 0 | 100.0 | 139.4 | 141.5 | | 1 | — | | 16.66 |
| 13 | 3 | 0 | 1 | 96.0 | 99.3 | | | 4 | N | | 21.33 |
| 14 | 0 | 3 | 1 | 96.0 | 98.2 | | | 4 | N | | 22.36 |
| 15 | 3 | 3 | 0 | 96.0 | 95.7 | | | 4 | Bluest | Y | 21.23 |
| 16 | 0 | 0 | 1 | 96.0 | 100.9 | | | 3 | Yellowest | | 18.90 |
| 17 | 3 | 0 | 0 | 96.0 | 101.9 | | | 2 | B | Y | 18.29 |
| 18 | 0 | 3 | 0 | 96.0 | 100.1 | | | 2 | B | Y | 19.28 |
| 19 | 3 | 3 | 1 | 96.0 | 94.9 | | | 5 | N | | 24.15 |

[1]Formulations are given as percentages of polymer and additives. G = NYAD ® Wollastonite; 400 = NYAD ® 400 Wollastonite; W610 = Zeeospheres ® ; PET = ground (20 mesh) polyethylene terephthalate.
[2]Degrees refer to the angle of the sample relative to the measuring device. It is known that gloss measurements should be less than 100. These data should therefore be considered relative comparisons.
[3]A visual measure of opacity. 1 = Clear; higher numbers indicate more opaque. N = neutral color; B = blue; Y = Yellow; — = not applicable
[4]Under tone: the visual color tone of the sample when light is transmitted through it.
[5]Top tone: the visual color tone of the exterior of the sample.
[6]A measure of opacity. A higher number indicates more opaque.
[7]Baseline data for samples 9–11 illustrates the reproducibility of the tests. Test data is for each concentrate test sample 12–19.

TABLE 3

(Examples 20–23)

|  |  |
|---|---|
| 20. Frost Concentrate for PET | |
| Ground PET | 80.3% |
| Boron Nitride (Polartherm ® 110) | 12.5% |
| Castorwax ® | 7.0% |
| Irganox B 900[1] | 0.2% |
| Let Down Ratio[2] | 25:1 |
| 21. Frost Concentrate for PET | |
| Ground PET | 79.951% |
| Boron Nitride (Polartherm ® 110) | 15.991% |
| Castorwax ® | 4.000% |
| Premier (GS) Blue (6102)[3] | 0.044 |
| Channel Black (TR 354 D)[4] | 0.014% |
| Let Down Ratio | 33:1 |
| 22. Frost Concentrate for GPPS | |
| Ground GPPS (555 PS) | 67.139% |
| Boron Nitride (Polartherm ® 110) | 25.000% |
| Advawax ® 280[7] | 5.000% |
| Calcium Carbonate (9150) | 2.500% |
| Macrolex Violet 3R[8] | 0.185% |
| Black Powder (Raven ® 1170)[9] | 0.066% |
| Let Down Ratio | 50:1 |
| 23. Frost Compound (in PET)[5] | |
| Ground PET | 96.9% |
| NYAD ® 400 Wollastonite[6] | 2.0% |
| 108 Low-Micron White Barytes[7] | 1.0% |
| Boron Nitride (Polartherm ® 110) | 0.1% |
| Let Down Ratio | NA[10] |

[1]An antioxidant. Geigy Chemical Corporation, Ardsley, NY.
[2]The ratio of the let down resin to the concentrate in the final composition suitable for molding, extruding or forming the final polymer product.
[3]An ultramarine blue pigment. Whittaker, Clark & Daniels, Inc., South Plainfield, NJ.
[4]Carbon black.
[5]An organic pigment.
[6]Example 23 shows final composition of materials in the end part.
[7]Whittaker, Clark & Daniels, Inc., South Plainfield, NJ.
[8]Carlisle Chemical Works, Inc., Reading, OH.

TABLE 3-continued (Examples 20–23)

[8] A dye. Farberfabriken Bayer AG. Germany.
[9] A carbon black. Columbian Chemical Company, Tulsa, OK.
[10] Not applicable.

TABLE 4

(Examples 24–32)
Translucence Measurements Of A Molded Plaque, Comprising GPPS[1], Boron Nitride (Polartherm ® 110) As A Particulate, Light Diffusing Material, and Ethylene-Bis-Stearamide As A Dispersing Agent.[2]

| Sample Number | Loading %[3] | Thickness (mils) | % Trans. | % Haze | % Clarity |
|---|---|---|---|---|---|
| 24 | 0 | 30 | 92.3 | 0.9 | 99.2 |
| 24 | 0 | 60 | 92.2 | 1.4 | 97.8 |
| 25 | 0.1 | 30 | 89.8 | 12.0 | 91.3 |
| 25 | 0.1 | 60 | 87.3 | 22.0 | 84.7 |
| 26 | 0.5 | 30 | 86.6 | 28.1 | 79.1 |
| 26 | 0.5 | 60 | 81.3 | 47.8 | 63.2 |
| 27 | 1.0 | 30 | 80.5 | 56.5 | 58.7 |
| 27 | 1.0 | 60 | 70.4 | 81.2 | 34.4 |
| 28 | 2.0 | 30 | 78.1 | 65.2 | 50.5 |
| 28 | 2.0 | 60 | 67.0 | 88.2 | 26.5 |
| 29 | 5.0 | 30 | 66.7 | 93.8 | 19.5 |
| 29 | 5.0 | 60 | 52.3 | 101.5 | 6.3 |
| 30 | 10.0 | 30 | 52.1 | 102.0 | 14.4 |
| 30 | 10.0 | 60 | 38.4 | 103.0 | 1.5 |
| 31 | 25.0 | 30 | 30.5 | 101.9 | 0.1 |
| 31 | 25.0 | 60 | 19.5 | 102.5 | 0.0 |
| 32 | 50.0 | 30 | 24.3 | 102.5 | 0.0 |
| 32 | 50.0 | 60 | 24.3 | 102.5 | 0.0 |
| benchmark[4] | — | — | 79.5 | 95.8 | 5.6 |

[1] GPPS = ground (** mesh) general purpose polystyrene.
[2] Sample 24 contains only GPPS. Samples 25–32 contain GPPS, boron nitride (Polartherm ® 110), and ethylene-bis-stearamide as a dispersing aid.
[3] Loading % is percent by weight of boron nitride in the final molded plaque.
[4] 0.25 inch frosted glass pane, frosted side measured.

TABLE 5

(Examples 33–44)
Translucence Measurements of a Molded Plaque, Comprising PET[1], Boron Nitride (Polartherm ® 110) As A Particulate, Light Diffusing Material, and Castorwax ® As A Dispersing Agent.[2]

| Sample Number | Loading %[3] | Thickness (mils) | % Trans. | % Haze | % Clarity |
|---|---|---|---|---|---|
| 33 | 0 | 30 | 89.1 | 1.6 | 99.1 |
| 33 | 0 | 60 | 85.9 | 3.2 | 96.8 |
| 34 | 0.1 | 30 | 85.7 | 16.7 | 89.2 |
| 34 | 0.1 | 60 | 80.6 | 29.3 | 81.2 |
| 35 | 0.2 | 30 | 83.5 | 27.3 | 81.4 |
| 35 | 0.2 | 60 | 76.8 | 45.3 | 68.5 |
| 36 | 0.5 | 30 | 76.9 | 56.2 | 60.1 |
| 36 | 0.5 | 60 | 66.4 | 78.7 | 39.1 |
| 37 | 1.0 | 30 | 71.9 | 76.6 | 45.2 |
| 37 | 1.0 | 60 | 59.2 | 92.0 | 22.9 |
| 38 | 1.5 | 30 | 65.3 | 88.0 | 28.2 |
| 38 | 1.5 | 60 | 50.4 | 99.4 | 10.1 |
| 39 | 2.0 | 30 | 61.7 | 94.2 | 20.9 |
| 39 | 2.0 | 60 | 45.5 | 101.5 | 6.5 |
| 40 | 2.5 | 30 | 59.0 | 97.0 | 15.8 |
| 40 | 2.5 | 60 | 43.0 | 102.5 | 4.8 |
| 41 | 5.0 | 30 | 46.2 | 102.5 | 4.6 |
| 41 | 5.0 | 60 | 31.4 | 102.3 | 1.1 |
| 42 | 10.0 | 30 | 32.8 | 102.3 | 2.9 |
| 42 | 10.0 | 60 | 20.1 | 103.0 | 0.0 |
| 43 | 25.0 | 30 | 17.65 | 102.5 | 0.0 |
| 43 | 25.0 | 60 | 7.91 | 103.0 | 0.0 |
| 44 | 50.0 | 30 | 4.79 | 103.0 | 0.0 |
| 44 | 50.0 | 60 | 1.07 | 103.0 | 0.0 |
| benchmark[4] | — | — | 79.5 | 95.8 | 5.6 |

[1] PET = ground (20 mesh) polyethylene terephthalate.
[2] Sample 33 contains only PET. Samples 34–44 contain PET, Boron Nitride Polartherm ® 110 and Castorwax ® as a dispersing aid.
[3] Loading % is the percent by weight of boron nitride in the final molded plaque.
[4] 0.25 inch frosted glass pane, frosted side measured.

TABLE 6

(Examples 45–51)
Translucence Measurements Of A Molded Plaque, Comprising PET[1], Boron Nitride (AS0517) As A Particulate, Light Diffusing Material, And Castorwax ® As A Dispersing Agent.[2]

| Sample Number | Loading %[3] | Thickness (mils) | % Trans. | % Haze | % Clarity |
|---|---|---|---|---|---|
| 45 | 0 | 30 | 89.1 | 1.6 | 99.1 |
| 45 | 0 | 60 | 85.9 | 3.2 | 96.8 |
| 46 | 0.2 | 30 | 81.9 | 36.6 | 76.1 |
| 46 | 0.2 | 60 | 74.8 | 58.1 | 60.3 |
| 47 | 0.5 | 30 | 76.7 | 63.4 | 55.3 |
| 47 | 0.5 | 60 | 66.1 | 85.9 | 30.4 |
| 48 | 1.0 | 30 | 70.3 | 83.6 | 35.0 |
| 48 | 1.0 | 60 | 56.8 | 98.1 | 11.9 |
| 49 | 1.5 | 30 | 63.3 | 94.8 | 17.5 |
| 49 | 1.5 | 60 | 47.4 | 102.0 | 5.2 |
| 50 | 2.0 | 30 | 60.4 | 98.7 | 12.7 |
| 50 | 2.0 | 60 | 43.6 | 102.8 | 4.1 |
| 51 | 5.0 | 30 | 45.9 | 102.3 | 4.7 |
| 51 | 5.0 | 60 | 30.0 | 103.0 | 3.0 |
| benchmark[4] | — | — | 79.5 | 95.8 | 5.6 |

[1] PET = ground (20 mesh) polyethylene terephthalate.
[2] Sample 45 contains only PET. Samples 46–51 contain PET, Boron Nitride (Carborundum Carbotherm ® AS0517), and Castorwax ® as a dispersing aid.
[3] Loading % is the percent by weight of boron nitride in the final molded plaque.
[4] 0.25 inch frosted glass pane, frosted side measured.

TABLE 7

(Examples 52–65)
Translucence Measurements Of A Molded Plaque, Comprising GPPS[1], Various Particulate, Light Diffusing Materials, And Ethylene-Bis-Stearamide As A Dispersing Agent.[2]

| Sample Number | Particulate Material | Loading %[3] | Thickness (mils) | 20° Gloss | % Trans. | % Haze | % Clarity |
|---|---|---|---|---|---|---|---|
| 52 | — | 0 | 30 | 75.87 | 92.53 | 3.26 | 91.23 |
| 52 | — | 0 | 60 | 110.20 | 92.07 | 1.85 | 94.83 |
| 53 | BaSO$_4$[4] | 1.0 | 30 | 42.6 | 90.6 | 31.75 | 82.63 |
| 53 |  | 1.0 | 60 | 62.90 | 88.75 | 51.68 | 77.30 |
| 54 | BaSO$_4$ | 2.0 | 30 | 25.88 | 89.9 | 57.05 | 69.63 |
| 54 |  | 2.0 | 60 | 44.50 | 87.65 | 73.60 | 59.65 |
| 55 | BaSO$_4$ | 3.0 | 30 | 26.9 | 88.9 | 66.12 | 61.25 |
| 55 |  | 3.0 | 60 | 47.00 | 85.80 | 86.23 | 42.98 |
| 56 | CaCO$_3$[5] | 0.5 | 30 | 39.0 | 88.98 | 18.6 | 81.6 |
| 56 |  | 0.5 | 60 | 56.68 | 85.45 | 35.95 | 78.35 |
| 57 | CaCO$_3$ | 1.0 | 30 | 30.22 | 88.3 | 36.28 | 72.05 |
| 57 |  | 1.0 | 60 | 55.68 | 84.30 | 77.75 | 60.80 |
| 58 | Talc[6] | 0.5 | 30 | 65.9 | 91.45 | 10.51 | 89.00 |
| 58 |  | 0.5 | 60 | 92.08 | 90.25 | 10.17 | 92.35 |
| 59 | Talc | 1.0 | 30 | 62.2 | 91.83 | 10.62 | 87.95 |
| 59 |  | 1.0 | 60 | 85.55 | 90.78 | 9.75 | 90.70 |
| 60 | Glass | 1.0 | 30 | 22.4 | 79.95 | 68.22 | 50.32 |
| 60 | Beads[7] | 1.0 | 60 | 40.8 | 71.45 | 83.48 | 34.48 |
| 61 | Glass Beads | 1.5 | 30 | 29.2 | 77.6 | 61.0 | 40.98 |
| 61 |  | 1.5 | 60 | 50.7 | 67.5 | 89.6 | 22.83 |
| 62 | Functional | 0.25 | 30 | 28.4 | 78.35 | 58.22 | 84.1 |
| 62 | Mica[8] | 0.25 | 60 | 43.85 | 68.45 | 76.33 | 84.35 |
| 63 | Satin Mica[9] | 0.25 | 30 | 31.3 | 58.6 | 68 | 65.33 |
| 63 |  | 0.25 | 60 | 52.60 | 44.10 | 85.65 | 50.30 |
| 64 | Wollastonite | 1.5 | 30 | 38.5 | 90.33 | 42.1 | 61.78 |
| 64 | NYAD® 400[10] | 1.5 | 60 | 61.10 | 88.50 | 57.63 | 46.73 |
| 65 | Wollastonite | 3.0 | 30 | 22.8 | 86.48 | 69.9 | 31.98 |
| 65 | NYAD® 400 | 3.0 | 60 | 39.40 | 82.40 | 84.20 | 15.95 |
| benchmark[11] | — | — | 2.5 | — | 79.5 | 95.8 | 5.6 |

[1]GPPS = ground (** mesh) general purpose polystyrene.
[2]Sample 52 contains only GPPS. Samples 53–65 contain GPPS, various particulate, light diffusing materials, and Ethylene Bis-Stearamide as a dispersing aid.
[3]Loading % is the percent by weight of particulate material in the final molded plaque.
[4]Barytes 108 Low Micron, available from Whittaker, Clark & Daniels, Inc., South Plainfield, NJ (Manufactured by Huber).
[5]Omyacarb ® 4 (Omya, Inc.).
[6]Talc 399, available from Whittaker, Clark & Daniels, Inc., South Plainfield, NJ (Manufactured by Specialty Mineral)
[7]Scotchlite ® Glass Bubbles S60/10000 (3M, St. Paul Minnesota).
[8]LS-810 Lazier Flair ® (E. M. Industries, Hawthorne, NY).
[9]Afflair ® 110 Fine Satin (E. M. Industries, Hawthorne, NY).
[10]NYCO Minerals, Inc., Willsboro, NY.
[11]0.25 inch frosted glass pane, frosted side measured.

I claim:

1. An entire molded, extruded or formed polymer product having a translucent optical appearance, consisting of a substantially homogeneous composition that comprises:
   (i) 0.01 to 15 parts by weight of boron nitride;
   (ii) a dispersing agent selected from the group consisting of silicone waxes, fatty acids, metallic salts, ionomer waxes, amide waxes, hydroxy stearates, olefinic waxes, and mixtures thereof; and
   (iii) 85 to 99.99 parts by weight of a polymer that is finely ground, finely flaked or finely pelletized, or a mixture thereof, wherein the polymer is selected from the group consisting of transparent and near transparent thermoplastic polymers, and mixtures thereof.

2. The polymer product of claim 1, wherein the substantially homogeneous composition further comprises a flow enhancing compound.

3. The polymer product of claim 2, wherein the substantially homogeneous composition comprises about 0.1 to about 7 parts by weight of the flow enhancing compound.

4. The polymer product of claim 2, wherein the flow enhancing compound is selected from the group consisting of fumed silica, precipitated silica, and mixtures thereof.

5. The polymer product of claim 1, wherein the boron nitride is in a form selected from the group consisting of powders, fibers, whiskers, platelets, flakes, aggregates, agglomerates, and mixtures thereof.

6. The polymer product of claim 1, wherein the boron nitride comprises an average maximum particle size of from about 0.1 microns to about 200 microns.

7. An entire molded, extruded or formed polymer product having a translucent optical appearance, consisting of a substantially homogeneous composition that comprises:
   0.1 to 15 parts by weight of a substantially homogeneous mixture that comprises:
   (i) 40 to 90 parts by weight of a carrier agent that is finely ground, finely flaked or finely pelletized, or a mixture thereof, wherein the carrier agent is selected from the group consisting of a first transparent thermoplastic polymer, a first near transparent thermoplastic polymer, a dispersing agent, and mixtures thereof, wherein the dispersing agent is selected from the group consisting of silicone waxes, fatty acids, metallic salts, ionomer waxes, amide waxes, hydroxy stearates, olefinic waxes, and mixtures thereof; and (ii) 10 to 60 parts by weight of boron nitride; and 85 to 99.9 parts by weight of a second polymer selected from the group consisting of transparent and near transparent polymers, and mixtures thereof, that are chemically compatible with the carrier agent.

8. The polymer product of claim 7, wherein the boron nitride is in a form selected from the group consisting of powders, fibers, whiskers, platelets, flakes, aggregates, agglomerates, and mixtures thereof.

9. The polymer product of claim 7, wherein the substantially homogeneous composition further comprises a flow enhancing compound.

10. The polymer product of claim 9, wherein the flow enhancing compound is selected from the group consisting essentially of fumed silica, precipitated silica, and mixtures thereof.

11. The polymer product of claim 9, wherein the substantially homogeneous composition comprises about 0.1 to about 7 parts by weight of the flow enhancing compound.

12. The polymer product of claim 7, wherein the boron nitride comprises an average maximum particle size of from about 0.1 microns to about 200 microns.

* * * * *